United States Patent
Yatabe et al.

(10) Patent No.: US 7,317,837 B2
(45) Date of Patent: Jan. 8, 2008

(54) ENCODING APPARATUS, VIDEO CAMERA

(75) Inventors: Yusuke Yatabe, Yokohama (JP); Hironori Komi, Tokyo (JP); Masahiro Fujimoto, Yokohama (JP); Masaru Takahashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 924 days.

(21) Appl. No.: 10/655,683

(22) Filed: Sep. 5, 2003

(65) Prior Publication Data

US 2004/0234145 A1 Nov. 25, 2004

(30) Foreign Application Priority Data

May 19, 2003 (JP) ............................. 2003-139759

(51) Int. Cl.
*G06K 9/36* (2006.01)
(52) U.S. Cl. ....................................... 382/232; 382/245
(58) Field of Classification Search ................ 382/232, 382/233, 234, 236, 238, 239, 251, 245; 375/240.15, 375/240.12, 240.25; 348/416.1; 250/231.13, 250/231.16; 356/634; 700/213; 704/230
See application file for complete search history.

(56) References Cited

U.S. PATENT DOCUMENTS 6,393,152 B2 * 5/2002 Takahashi et al. .......... 382/233
6,477,202 B1 * 11/2002 Takeuchi et al. ........ 375/240.15
6,801,574 B2 * 10/2004 Takeuchi et al. ........ 375/240.15

FOREIGN PATENT DOCUMENTS

JP    11-136683    5/1999
JP    2000-312363    11/2000

* cited by examiner

*Primary Examiner*—Anh Hong Do
(74) *Attorney, Agent, or Firm*—Townsend and Townsend and Crew LLP

(57) ABSTRACT

An encoding apparatus includes a first encoder for encoding inputted picture information at a first rate or first resolution, and a second encoder for encoding the inputted picture information at a second rate lower than the first rate or at second resolution lower than the first resolution, in which when the second encoder encodes picture information, the second encoder encodes the picture information by use of encoding information of picture information in the first encoder corresponding to the picture information, and the encoding apparatus outputs the picture information encoded by the first encoder and the second encoder, respectively, thereby the second encoder executing the encoding by using encoding information of the first encoder.

15 Claims, 3 Drawing Sheets

ENCODING APPARATUS, VIDEO CAMERA

BACKGROUND OF THE INVENTION

1. Field of the Invention

This invention relates to an encoding apparatus for encoding picture information and a video camera using the encoding apparatus.

2. Description of the Related Art

MPEG2_Video (ISO/IEC13818-2), for example, is known as a motion picture compression system that is directed to a high rate and high resolution. MPEG4_Video (ISO/IEC14496-2), for example, is also known as a motion picture compression system that is directed to a low rate and low resolution.

Here, JP-A-2000-312363 has proposed a technology for controlling a rate of MPEG4 by use of side information (such as total encoding amount) when MPEG2 is decoded to trans-code an MPEG2 stream into an MPEG4 stream.

On the other hand, JP-A-11-136683 has proposed a technology for utilizing a picture signal having low resolution to encode a frame of a video signal having high resolution.

In the trans-code disclosed in JP-A-2000-312363 described above, the output has one system, and picture information having high resolution/high rate and picture information having low resolution/low rate cannot be outputted and recorded simultaneously.

The technology for encoding picture information having high resolution by utilizing more effectively the picture signal having low resolution that is disclosed in JP-A-11-136683 cannot improve picture quality of picture information having low resolution/low rate.

SUMMARY OF THE INVENTION

It is an object of the invention to provide an encoding apparatus capable of outputting picture information in high picture quality, a video camera using the encoding apparatus and an encoding method.

The object described above can be accomplished by an encoding apparatus comprising a first encoder for encoding inputted picture information at a first rate or first resolution and a second encoder for encoding the inputted picture information at a second rate lower than the first rate or at second resolution lower than the first resolution, wherein, when the second encoder encodes picture information, it encodes the picture information by use of encoding information of picture information in the first encoder corresponding to the picture information, and the encoding apparatus outputs the picture information encoded by the first encoder and the second encoder, respectively.

BRIEF DESCRIPTION OF THE DRAWINGS

The above and other objects, features and advantages of the invention will become more readily apparent from the following detailed description when taken in conjunction with the accompanying drawings, wherein.

DETAILED DESCRIPTION OF THE INVENTION

An embodiment of the invention will be hereinafter explained with reference to the accompanying drawings.

Figure 1:
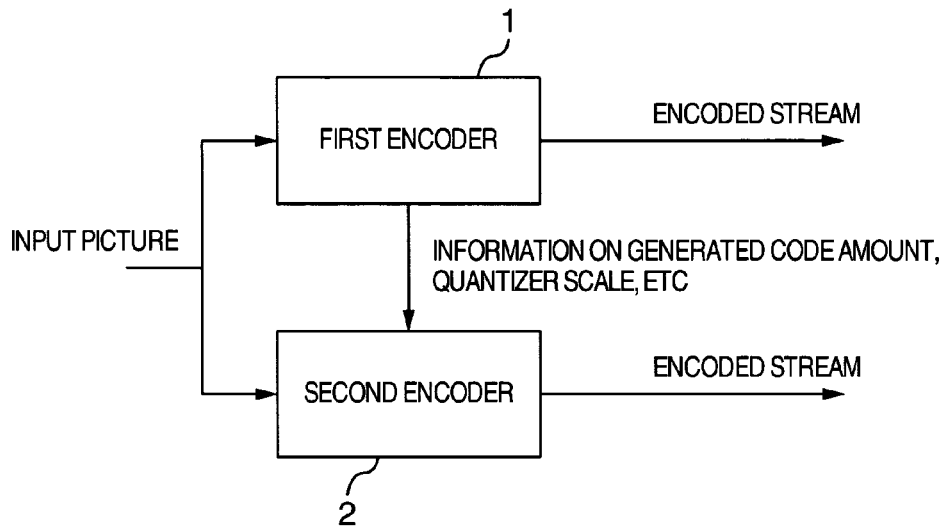
FIG. 1 is a simplified block diagram of MPEG2/4 simultaneous recording.

FIG. 1 is a block diagram of an encoding apparatus according to an embodiment of the invention. When an inputted picture of the same timing is encoded by a first encoder 1 and a second encoder 2, respectively, the second encoder carries out encoding by use of information on a generation encoding amount of the first encoder, information on a quantizer scale and a judgment result of Intra/Inter encoding.

Figure 2:
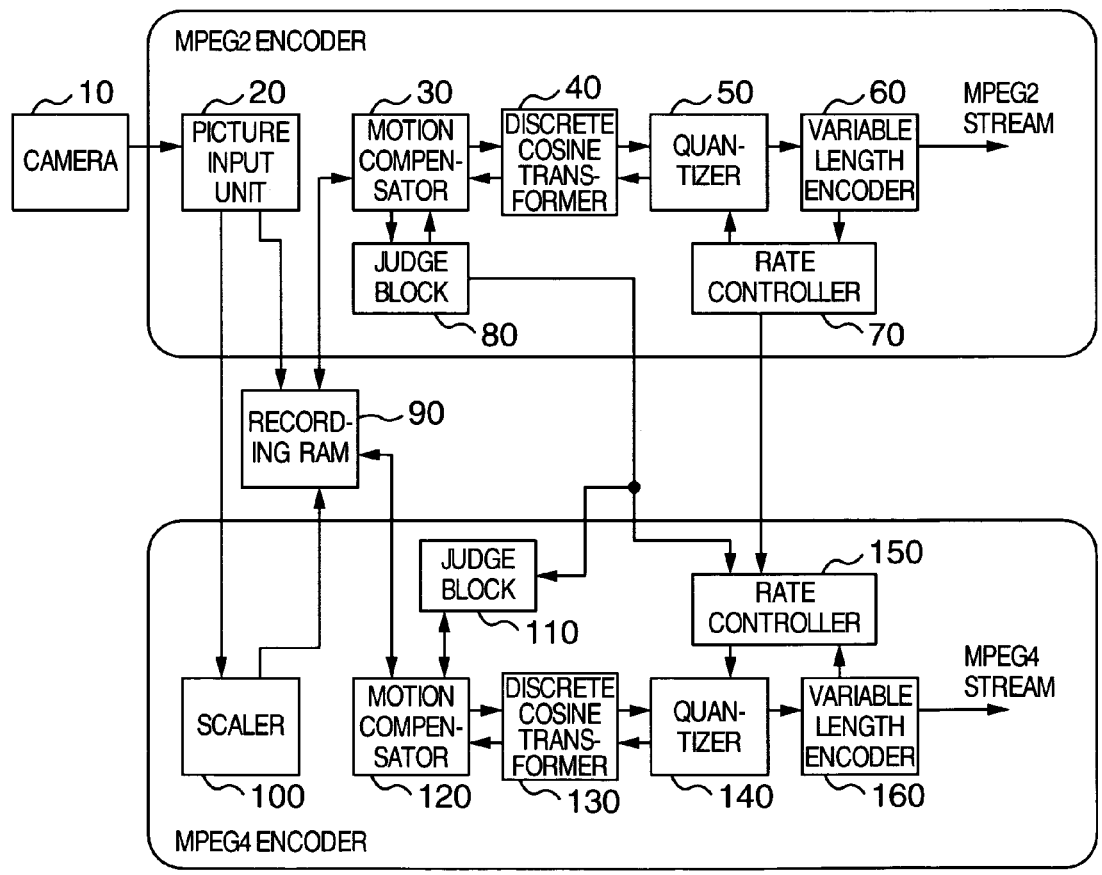
FIG. 2 is a block diagram of MPEG2/4 simultaneous recording.

FIG. 2 is a block diagram of the encoding apparatus according to the embodiment of the invention. To achieve MPEG2 recording, a picture input unit 20 converts an analog signal inputted from a camera 10 to a digital picture form, and stores it in a recording RAM 90. A motion compensator 30 reads outs a picture necessary for motion compensation in an encoder and compensates the motion. A judge block (Intra/Inter judge block) 80 executes changeover the judgment of Intra/Inter encoding. A discrete cosine transformer 40 executes discrete cosine transform. A quantizer 50 executes quantization. A rate controller 70 carries out rate control. A variable length encoder 60 encodes codes in MPEG2 and generates a stream of MPEG2. Decoded pictures locally decoded by the quantizer 50, discrete cosine transformer 40 and motion compensator 30 are stored in the recording RAM 90 and are used for motion compensation of a next frame.

In MPEG4 recording, a scaler (picture resolution converter) 100 scales motion picture data digitized by the picture input unit 20 to an object picture size of MPEG4 and stores the data in the recording RAM 90. The motion picture data is read out from this recording RAM 90, and an motion compensator 120, a judge block 110, a discrete cosine transforer 130, the a quantizer 140, a rate controller 150 and a variable length encoder 160 carry out motion picture compression and generate a stream of MPEG4, in the same way as in MPEG2 encoder. Local decoding is carried out by the same way as in MPEG2 encoder and the decoded picture is stored in the recording RAM.

In this instance, the Intra/Inter changeover information of the judge block 80 of MPEG2 encoder, a quantized value used for rate control in the rate controller 70, information of the code amount generated, etc, can be looked up in the rate controller 150 of MPEG4 encoder. The Intra/Inter changeover information can be also looked up in the judge block 110 of MPEG4 encoder.

It is possible in MPEG4 encoder to optimize the quantizer scale and the frame rate on the basis of this MPEG2's information. Specifically, the generation code amount for each input picture of MPEG2 encoder, the mean value of the quantizer scales, the changeover condition of the Intra/Inter encoding of each macro block and a quantization value are monitored. Those pictures in which a drastic change of these values exist are assumed as a scene change, and a process that makes it easier to increase the quantizer scale in MPEG4 encoder, a process that makes it easier to select Intra encoding in encoding of each macro block, a process that executes intra encoding of the picture itself and a thin-out processing of the pictures for which encoding of the pictures is not made are executed. Inside the pictures, too, each quantizer scale of MPEG2 encoder and the changeover condition of intra/inter encoding are monitored and easiness of encoding inside the pictures is ascertained. The quantizer scale and the changeover control of the intra/inter encoding are executed in response to the easiness so determined. Because encoding of MPEG4 encoder is executed by use of encoding information of MPEG2 encoder, the embodiment makes it possible to suppress deterioration of picture quality resulting from the drastic scene change and to improve quality of the MPEG4's pictures.

Incidentally, in an apparatus to which dual encoding according to the invention is provided, a first mode for executing the encoding in MPEG4 by use of encoding information of MPEG2 encoder and a second mode for executing the encoding in MPEG4 without using the encoding information of MPEG2 encoder may be provided. When the first and second modes are compared with each other, the first mode is superior in picture quality to the second mode. More specifically, when picture information in which a sudden scene change occurs is encoded in the second mode, the rate control comes to failure with the result that frame skips occur and the number of subsequent allotment bits becomes smaller. In contrast, when the picture information is encoded in the first mode, rate control does not fail and the frame skips do not occur. Therefore, picture quality can be said as being improved in comparison with the second mode. On the other hand, because the second mode does not use MPEG2 encoder, it is superior in power consumption to the first mode. When a changeover switch capable of changing both of these modes is provided, therefore, priority can be selected between picture quality and power consumption in accordance with user's demand.

Figure 3:
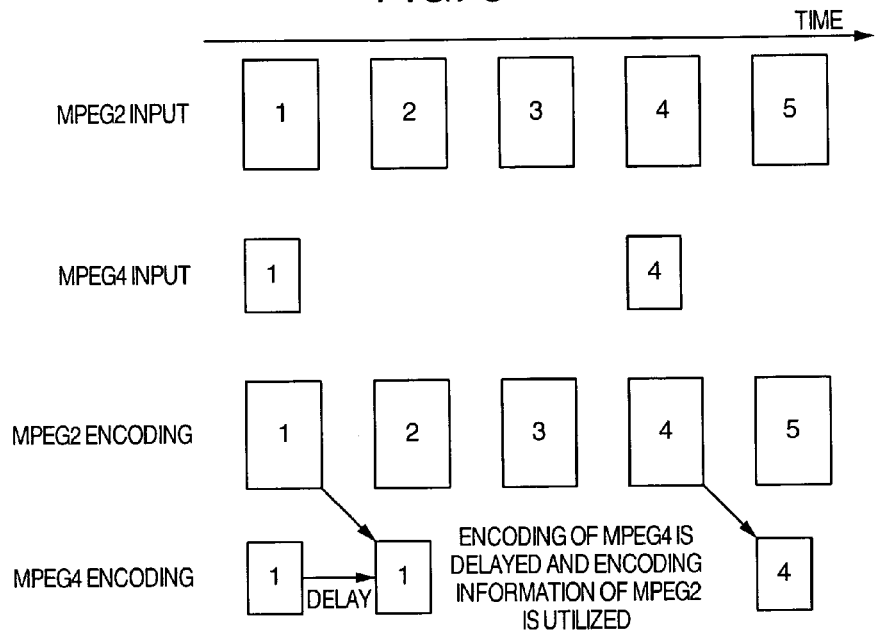
FIG. 3 is a timing chart of MPEG2/4 simultaneous recording.

Next, FIG. 3 shows an encoding timing when. MPEG2 and MPEG4 encodings are carried out.

The MPEG2 and MPEG4 encoders execute the encoding operation described above and encode the inputted pictures. However, MPEG4 encoder stores the inputted picture after scaling in the recording RAM and executes encoding with a time lag from picture encoding of MPEG2 encoder. Therefore, utilization of encoding information of MPEG2 encoder becomes easier.

Figure 4:
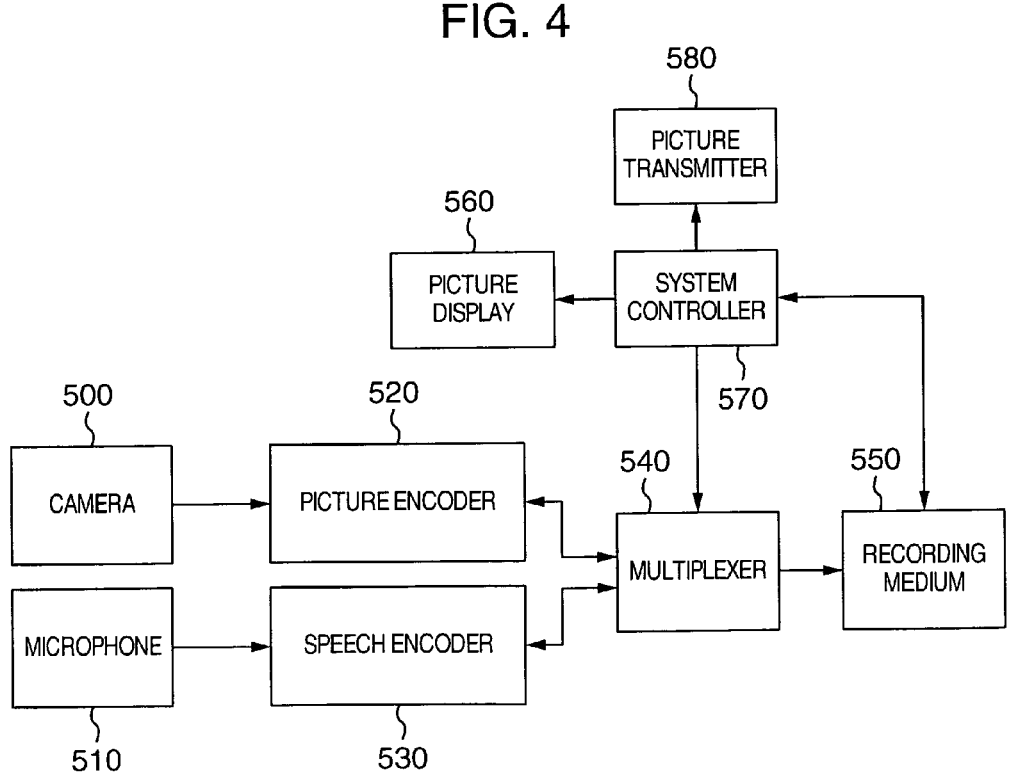
FIG. 4 is a block diagram of a video camera.

Next, FIG. 4 shows a video camera using the picture encoding apparatus according to the invention. The camera 500 converts an analog picture to a digital picture and a picture encoder 520 executes picture encoding of MPEG2 and MPEG4 encoders. A microphone 510 inputs an analog speech and coverts it to a digital speech. A speech encoder 530 encodes the digital speech. A multiplexer 540 multiplexes speech data and picture data and stores multiplex data as a stream of MPEG's picture in a recording medium 550. A system controller 570 controls each constituent block. A picture display 560 executes conversion to a picture display form (e.g. NTSC). A picture transmitter 580 executes control when the data recorded in MPEG4 encoder is transmitted to cellular telephone units, etc. Simultaneous encoding of MPEG2 and MPEG4 encoders is appropriately made depending on a user's selection. The MPEG2 stream is stored in the recording medium and the MPEG4 stream is reproduced by an output monitor and is transmitted to the cellular telephone units, etc. When the video camera of this embodiment is used for a monitor camera system, it is possible to record the data encoded by MPEG2 encoder to the recording medium and to transmit the data encoded by MPEG4 encoder to a communication terminal. When any change occurs in the picture taken (such as when the camera catches a burglar), the video camera can provide a high quality picture. When the change of the picture taken is great (when the change of encoding information such as the encoding amount generated is great), an alarm may be notified to the user on the communication terminal side through any means such as an alarm sound or rays of light.

Figure 5:
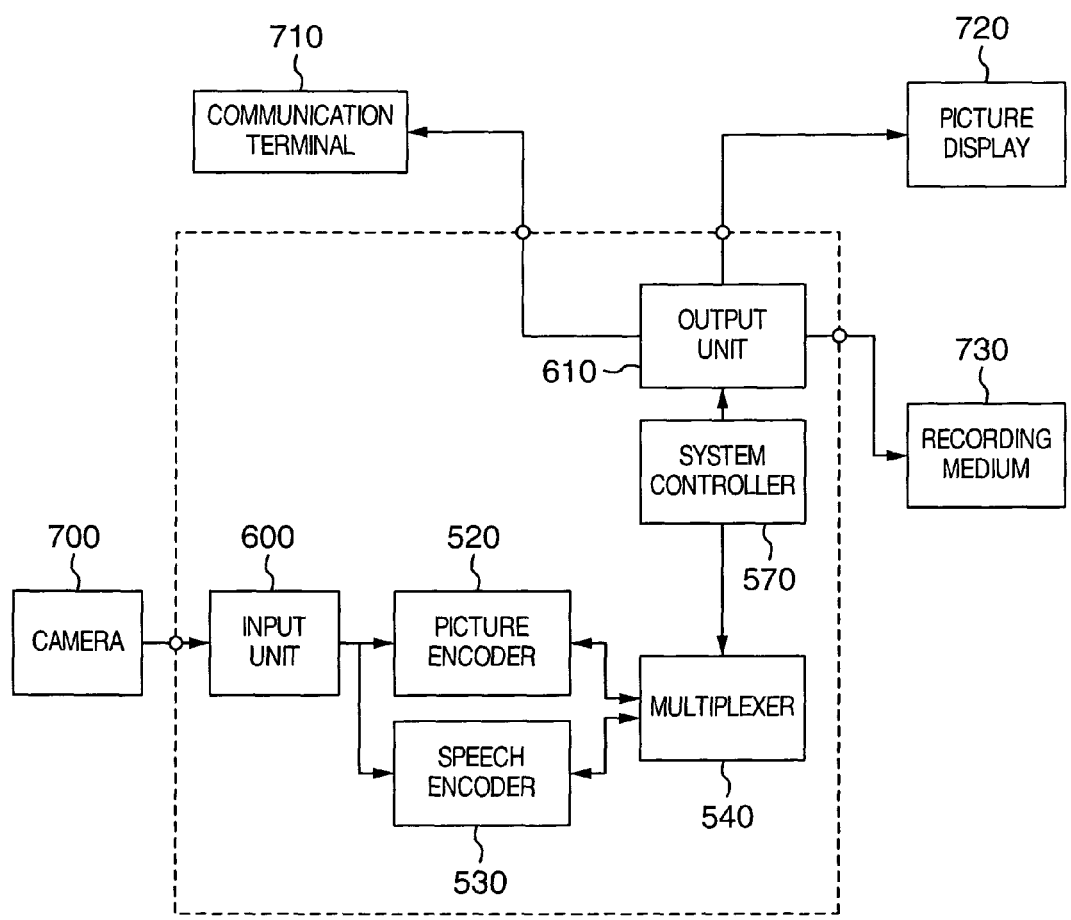
FIG. 5 is a block diagram of a digital signal inputting/outputting apparatus.

Next, FIG. 5 shows a digital signal inputting/outputting apparatus using the picture encoding apparatus and a system construction using the inputting/outputting apparatus. The blocks that have already been explained are denoted by the same reference numerals, and the explanation of such blocks will be omitted. Here, the portion indicated by dotted lines represents the digital signal inputting/outputting apparatus. The output block 610 transmits the picture information to the communication terminal 710, the recording medium 730 or the picture display 720. Incidentally, though the recording medium 730 and the picture display 720 are shown arranged outside, they may well be arranged inside the digital signal inputting/outputting apparatus. The apparatus to which the input unit 600 is connected is not limited to the camera 700.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and the range of equivalency of the claims are therefore intended to be embraced therein.

What is claimed is:

1. An encoding apparatus comprising:
    a first encoder for encoding inputted picture information at a first rate or first resolution; and
    a second encoder for encoding said inputted picture information at a second rate lower than said first rate or at second resolution lower than said first resolution;
    wherein, when said second encoder encodes picture information, said second encoder encodes said picture information by use of encoding information of picture information in said first encoder corresponding to said picture information, and said encoding apparatus outputs the picture information encoded by said first encoder and said second encoder, respectively,
    wherein said second encoder encodes corresponding picture information with a predetemined time lag from an encoding timing of picture information by said first encoder.

2. An encoding apparatus according to claim 1, wherein said encoding information is a quantization value.

3. An encoding apparatus according to claim 1, wherein said encoding information is changeover information of intra picture encoding or inter picture encoding of a macro block of picture information in said first encoder.

4. An encoding apparatus according to claim 1, wherein said first encoder is an MPEG2 encoder and said second encoder is an MPEG4 encoder.

5. An encoding apparatus comprising:
    a first encoder including a picture information input unit for inputting first picture information, a first judge block for conducting changeover judgment of intra picture encoding and inter picture encoding, a first quantization unit for conducting quantization and a rate controller for conducting rate control, said first encoder encoding first picture information inputted from said picture information input unit at a first rate or first resolution; and
    second encoder including a scaler block for scaling said first picture information and generating second picture information, a second judge block for conducting changeover judgment of intra picture encoding and inter picture encoding, a second quantization unit for conducting quantization of said second picture information and a second rate controller for conducting rate control of said second picture information by use of a parameter, said second encoder encoding said second picture information at a second rate lower than said first rate or at second resolution lower than said first resolution;

wherein, when said second encoder encodes said second picture information, said second rate controller refers to the changeover information of said first judge block between said intra picture encoding and said inter picture encoding, or said parameter used for the rate control in said first rate controller, said second judge block refers to said changeover information of said first judge block between intra picture encoding and inter picture encoding, and when a predetermined change exists in said parameter so referred to, said second rate controller executes rate control of the information amount in response to said predetermined change, said second picture information is encoded, and the first and second picture information encoded by said first encoder and said second encoder, respectively, are outputted.

6. An encoding apparatus according to claim 5, wherein said parameter is a generated code amount generated during encoding by said first encoder or a quantization value or a quantizer scale in said first quantization unit; when said parameter changes beyond a predetermined value, said second rate controller increases the quantization value in said second encoder and decreases the generation code amount or a frame rate in response to the change.

7. An encoding apparatus according to claim 5, wherein said first encoder is an MPEG2 encoder and said second encoder is an MPEG4 encoder.

8. An encoding method using a first encoder for encoding inputted picture information at a first rate or first resolution and a second encoder for encoding the inputted picture information at a second rate lower than said first rate or at second resolution lower than said first resolution, said encoding method comprising the steps of:

encoding picture information by use of said first encoder;

when picture information is encoded by use of said second encoder, encoding said picture information by use of encoding information of picture information in said first encoder corresponding to said picture information; and outputting first and second picture information encoded by said first and second encoders, respectively, wherein said second encoder encodes corresponding picture information with a predetermined time lag from an encoding timing of picture information by said first encoder.

9. An encoding method according to claim 8, wherein said first encoder is an MPEG2 encoder and said second encoder is an MPEG4 encoder.

10. A video camera capable of recording picture information taken to a recording medium, comprising:

a first encoder for encoding picture information taken at a first rate or first resolution;

a second encoder for encoding said picture information taken at a second rate lower than said first rate or at second resolution lower than said first resolution;

a recorder for recording picture information; and a transmitter for transmitting the picture information to outside;

wherein, when said second encoder encodes picture information, said second encoder encode said picture information by use of encoding information of picture information in said first encoder corresponding to said picture information;

said recorder records said picture information encoded by said first encoder; and said transmitter transmits said picture information encoded by said second encoder to outside, wherein said second encoder encodes corresponding picture information with a predetermined time lag from an encoding timing of picture information by said first encoder.

11. A video camera according to claim 10, wherein said first encoder is an MPEG2 encoder and said second encoder is an MPEG4 encoder.

12. A digital signal inputting/outputting apparatus comprising:

an input unit for inputting a digital signal from outside;

a first encoder for encoding the inputted digital signal at a first rate or first resolution;

a second encoder for encoding the inputted digital signal at a second rate lower than said first rate or at second resolution lower than said first resolution; and an output unit for outputting a digital signal to outside;

wherein, when said second encoder encodes picture information, said second encoder encodes said picture information by use of encoding information of picture information in said first encoder corresponding to said picture information, and said output unit outputs the picture information encoded by said first encoder to a recording medium and the picture information encoded by said second encoder to a communication terminals, wherein said second encoder encodes corsponding picture information with a predetermined time lag from an encoding timing of picture information by said first encoder.

13. An encoding apparatus comprising:

a first encoder for encoding the inputted picture information at a first rate or first resolution;

a second encoder for encoding the inputted picture information at a second rate lower than said first rate or at second resolution lower than said first resolution; and a changeover block for switching a first mode in which, when said second encoder encodes picture information, said second encoder encodes said picture information by use of encoding information of picture information in said first encoder corresponding to said picture information, and outputs the picture information so encoded, and a second mode in which, when said second encoder encodes picture information, said second encoder encodes said picture information without using an encoder of picture information in said first encoder corresponding to said picture information, and outputs the picture information so encoded.

14. An encoding apparatus comprising:

a first encoder for encoding inputted picture information by a first system having a first rate or first resolution; and a second encoder for encoding the inputted picture information by a second system having a second rate lower than said first rate or at second resolution lower than said first resolution;

wherein picture information containing a scene change that can be normally encoded by said first encoder but cannot cope with said scene change by use of only said second encoder and invites a frame skip is inputted, and is encoded by said second system without the frame skip.

15. An encoding apparatus comprising:

a first encoder for encoding inputted picture information at a first rate or first resolution;

a second encoder for encoding the inputted picture information at a second rate lower than said first rate or at second resolution lower than said first resolution; and first and second modes for outputting the picture information encoded by said second encoder;

wherein, when picture information containing a scene change that can be normally encoded by said first encoder but cannot cope with said scene change by use of only said second encoder and invites a frame skip is inputted, the picture information outputted in said first mode is outputted without the frame skip and the picture information outputted in said second mode is outputted with the frame skip.

* * * * *